US007082568B2

(12) United States Patent
Iwamoto et al.

(10) Patent No.: US 7,082,568 B2
(45) Date of Patent: Jul. 25, 2006

(54) INTERACTIVE DATA ANALYSIS SUPPORT APPARATUS AND MEDIA ON WHICH IS RECORDED AN INTERACTIVE DATA ANALYSIS SUPPORT PROGRAM

(75) Inventors: Masaki Iwamoto, Odawara (JP); Masato Honda, Odawara (JP); Toshihiko Fushimi, Odawara (JP); Teruyuki Suzuki, Odawara (JP); Masao Inoue, Odawara (JP); Kouichi Tsuzuki, Odawara (JP); Hiromi Kato, Odawara (JP)

(73) Assignee: Fujitsu Limited, Kawasaki (JP)

( * ) Notice: Subject to any disclaimer, the term of this patent is extended or adjusted under 35 U.S.C. 154(b) by 508 days.

(21) Appl. No.: 09/014,422

(22) Filed: Jan. 27, 1998

(65) Prior Publication Data

US 2001/0018694 A1   Aug. 30, 2001

(30) Foreign Application Priority Data

Jun. 20, 1997   (JP)   .................................. 9-163692

(51) Int. Cl.
G06F 15/00 (2006.01)
G06F 17/30 (2006.01)
(52) U.S. Cl. ...................................................... 715/503
(58) Field of Classification Search ................ 707/500, 707/503, 504, 509, 2, 3, 6, 101, 104.1; 715/500, 715/503, 504, 509
See application file for complete search history.

(56) References Cited

U.S. PATENT DOCUMENTS 5,664,127 A * 9/1997 Anderson et al. ........... 345/333
5,675,637 A * 10/1997 Szlam et al. ........... 379/114.19
5,819,293 A * 10/1998 Comer et al. ................ 707/203
5,848,425 A * 12/1998 Lowry et al. ................ 707/205
5,870,752 A * 2/1999 Gibbons et al. ............. 707/102
5,890,150 A * 3/1999 Ushijima et al. .............. 707/3
5,890,151 A * 3/1999 Agrawal et al. ............... 707/5
5,915,257 A * 6/1999 Gartung et al. ............. 707/503
5,926,822 A * 7/1999 Garman ....................... 707/503
5,933,796 A * 8/1999 Ashida et al. .............. 702/181
5,950,189 A * 9/1999 Cohen et al. ................... 707/3
5,960,437 A * 9/1999 Krawchuk et al. .......... 707/102
5,966,716 A * 10/1999 Comer et al. ............... 707/203
5,970,476 A * 10/1999 Fahey ......................... 705/28
5,970,506 A * 10/1999 Kiyan et al. ................. 707/503
5,974,187 A * 10/1999 Lee ............................. 382/242
5,978,788 A * 11/1999 Castelli et al. .................. 707/2
6,035,306 A * 3/2000 Lowenthal et al. ......... 707/200
6,049,797 A * 4/2000 Guha et al. ..................... 707/6
6,055,550 A * 4/2000 Wallack ....................... 715/509
6,205,431 B1 * 3/2001 Willemain et al. ............ 705/10

(Continued)

OTHER PUBLICATIONS

Microsoft Excel 97, Microsoft Corporation, pp. 1-11, 1997.*

*Primary Examiner*—Cong-Lac Huynh
(74) *Attorney, Agent, or Firm*—Staas & Halsey LLP

(57) ABSTRACT

An interactive data analysis support apparatus for supporting the analysis of data comprises: a cross tabulation display device for displaying according to specified summing up conditions a cross tabulation in which data to be analyzed is cross summed up, a cell specifying device for specifying at least one cell among a number of cells constituting the cross tabulation, and a graph display device for displaying the data to be analyzed as a graph within the range of the cell specified by the cell specifying device.

20 Claims, 13 Drawing Sheets

U.S. PATENT DOCUMENTS

| | | | |
|---|---|---|---|
| 6,246,410 B1 * | 6/2001 | Bergeron et al. | 345/744 |
| 6,263,337 B1 * | 7/2001 | Fayyad et al. | 707/6 |
| 6,272,487 B1 * | 8/2001 | Beavin et al. | 707/2 |
| 6,362,838 B1 * | 3/2002 | Szlam et al. | 345/762 |
| 6,389,380 B1 * | 5/2002 | Bankes | 703/17 |
| 6,421,670 B1 * | 7/2002 | Fourman | 707/10 |

* cited by examiner

TABLE TOP ITEMS (CONTROL POINT 1)

|  | X | Y | Z |
|---|---|---|---|
| A |  |  |  |
| B |  |  |  |
| C |  |  |  |
| D |  |  |  |

TABLE SIDE ITEMS (CONTROL POINT 2)

INTERACTIVE DATA ANALYSIS SUPPORT APPARATUS AND MEDIA ON WHICH IS RECORDED AN INTERACTIVE DATA ANALYSIS SUPPORT PROGRAM

BACKGROUND OF THE INVENTION

1. Field of the Invention

The present invention relates to technology for supporting the analysis of data using a programmed computer.

2. Description of the Related Art

Recently, there has been a boom in the more strategic use of large volumes of data stored in a data warehouse. As a result, the OLAP (Online Analytical Procedure) has gained recognition as a tool for end-users. With the current OLAP the basic structure involves cross tabulation in which a user himself/herself finds a problem heuristically while organizing data in tabular form, and then ascertains the cause of the problem. More specifically, the OLAP freely uses various distinctly defined sections to summarize by summing up for every section, and then organize the data.

Here, drilling, slicing, dicing and the like are used as means for freely using sections. When the data is organized or analyzed by drilling, slicing, dicing and the like, after recognizing a problem, the analyst makes out a value of a cell in the cross tabulation, and discerns the cause of the problem. The analyst then repeats a process to reorganize the data in sections for verifying the cause of the problem.

The process of making out a value of a cell in the cross tabulation and discerning the cause of the problem, however, is affected largely by the experience and skill of the analyst. In addition, the method of capturing the data and of defining sections differs for every analyst. Furthermore, when an analyst carries out an idea, new data must be prepared. Hence the data analysis becomes more complicated.

As a means to solve these problems, the applicant of this application has proposed a control method wherein a data model indicating sections is externally controlled as meta data, and a method of applying a concept of a "control point" which flexibly defines sections of information different for each person (Japanese Unexamined Patent Publication No. 8-180072).

However, there are still problems which cannot be solved by these methods.

Namely, when summarization is performed by summing up, there is a tendency to conceal the problems, and hence problems per se cannot be found. Hence the advantage of the OLAP cannot be utilized. Furthermore, the mechanism to simplify the cross tabulation simply increases the number of sections, making it difficult to search a section in order to ascertain the cause of a problem. In addition, since recently, the market and business are always fluctuating, it is necessary to change the sections corresponding to the fluctuations. Therefore, a deeper insight is required for the data analysis, and methods with only a verifying approach using sections prepared in advance, cannot be made to correspond to the fluctuations.

Hence, data mining which attempts to solve these problems by means of a discovery approach has been developed. Data mining is a technique which effectively utilizes large volumes of data stored in a data warehouse, and which performs automatic extraction of useful data.

However, though data mining effectively utilizes the data stored in the data warehouse, it has the following problems.

Namely, the contents of processing of the data mining are in a black box, and hence users do not know what kind of processing is performed. In addition, in order to use data mining, high skills in mathematics and business are required. Thus end-users cannot use it easily. Furthermore, even if what looks like the cause of a problem can be searched, verification is very difficult.

SUMMARY OF THE INVENTION

In view of the foregoing, it is an object of the present invention to provide a GUI (Graphic User Interface) which can freely handle large volumes of data stored in a data warehouse by a simple operation, so that end-users can perform data analysis effectively and easily.

It is a further object of the present invention to distribute media on which is recorded an interactive data analysis support program according to the present invention, so that a person having such a recording medium can easily construct an interactive data analysis support apparatus.

To achieve the above objective, the interactive data analysis support apparatus for supporting the analysis of data comprises: a cross tabulation display device for displaying according to specified summing up conditions a cross tabulation in which data to be analyzed is cross summed up, a cell specifying device for specifying at least one cell among a number of cells constituting the cross tabulation, and a graph display device for displaying the data to be analyzed as a graph within the range of the cell specified by the cell specifying device.

Here, "cross summing up" means to perform mathematical and statistical processing such as summing up, standard deviation and the like with respect to a specific row or a specific column in a two-dimensional array comprising at least one row and one column. Furthermore, "cell" means a constituent in a minimum unit defined by a specific row and a specific column in the cross tabulation.

With such a construction, after at least one cell is specified from a number of cells constituting a cross tabulation in which the data to be analyzed is cross-summed up, the data to be analyzed is displayed as a graph, according to need, within the range of the specified cell. Therefore, since only the data satisfying the conditions for searching the cause of problems is displayed, the analyst can analyze the data visually. Thus data analysis can be performed effectively and easily.

Here, the graph display device may comprise: a display limiting device for limiting the range of the data to be displayed, or a rearranging device for automatically rearranging the data to be displayed according to predetermined conditions, or have an automatic analyzing device for finding a new display item by extracting a characteristic of the data to be analyzed, and a display item-adding device for adding the found new display item to the graph.

According to such a structure, when the graph display device includes the display limiting device, since the range of the data to be displayed is limited by the display limiting device, only the data within the range which seems to be the cause of a problem can be displayed. Moreover, by limiting the range gradually during the search for the cause of problems, the ultimate cause can be easily found. Furthermore, when the graph display device includes the rearranging device, since the data to be displayed in a graph is rearranged in various orders by the rearranging device, the cause of problems may become apparent from the display order of the data. Furthermore, when the graph display device includes the automatic analyzing device and the display item-adding device, the display item found in the automatic analyzing device is added to the graph by the display item-adding device. Hence the cause of problems may become apparent. Therefore, the data analysis efficiency can be improved by the graph display device having one of the display limiting device, the rearranging device, or the automatic analyzing device and the display item-adding device.

Furthermore, the graph display device may comprise a storage device for storing the result of the operation performed on the graph display device as a summing up condition used by the cross tabulation display device, and the cross tabulation display device is capable of displaying cross tabulation in which the data to be analyzed is cross-summed up according to the stored summing up condition.

With such a construction, a result of the operation performed on the graph display device is stored by the storage device as a summing up condition, and by utilizing this summing up condition, the cross tabulation in which the data to be analyzed is cross-summed up can be displayed. Therefore, the operation performed in the search of causes of problems can also be utilized in the next search. Hence the analysis processing efficiency can be markedly improved.

Furthermore, the data to be analyzed may be an aggregate of records composed of a number of data items.

With such a construction, the data to be analyzed can be handled as an aggregate of records composed of the same data item. Hence the relevant records can be handled in a block by a simple operation, thereby improving the operability of the interactive data analysis support apparatus.

Furthermore, the graph display device may include a random extraction device for extracting a predetermined number of records at random from the data to be analyzed, so that a graph is displayed based on the extracted data.

With such a construction, only a predetermined number of records are extracted at random by the random extraction device, and a graph is displayed based on the extracted records. Hence the number of records used for the display of the graph is reduced. Therefore, the time for reading out the records from the database or the like is reduced, so that it becomes possible to display at a high speed in the graph display device. Therefore, even if the system does not have a high-speed processing ability, sufficient operation speed can be ensured in the data analysis processing, and hence the cost increase can be kept down.

Furthermore, the graph display device may have a structure such that a graph is displayed designating the data item as an axis.

With such a construction, since the value of the data item is displayed on the axis, the size of the value can be grasped intuitively. Thus the trend of the data can be easily grasped. Accordingly, in the data analysis, the occurrence of misidentification by the analyst can be reduced, and hence the accuracy of the analysis result can be improved.

In addition to this, the structure may be such that the graph display device comprises the same number of axes as the data items constituting the records, and plots a point corresponding to a value of each data item with regard to each of the records, to thereby display a graph in which points plotted on adjacent axes are connected by a segment.

With such a construction, since the correlation between the data items of each record and the correlation between the records are displayed visually, it becomes possible to search the cause of problems very easily. Hence, the efficiency of the data analysis can be improved.

According to another aspect of the present invention, a medium on which is recorded an interactive data analysis support program for supporting the analysis of data comprises: a cross tabulation display function for displaying according to specified summing up conditions a cross tabulation in which data to be analyzed is cross-summed up, a cell specifying function for specifying at least one cell among a number of cells constituting the cross tabulation, and a graph display function for displaying the data to be analyzed as a graph within the range of the cell specified by the cell specifying function.

Here, "medium" means something which can reliably record various information and reliably output the information according to need. Specifically, it corresponds to paper cards (punch cards), paper tapes, magnetic tapes, magnetic disks, magnetic drums, IC cards, CD-ROMs and the like.

With such a construction, there is recorded on a medium a program for realizing; a cross tabulation display function for displaying a cross tabulation in which the data to be analyzed is cross-summed up, a cell specifying function for specifying at least one cell among a number of cells constituting the cross tabulation, and a graph display function for displaying the data to be analyzed as a graph within the range of the specified cell. Therefore with a medium recording these programs, it becomes possible to provide the respective functions to a number of computers.

Here, the graph display function may comprise: a display limiting function for limiting the range of the data to be displayed, or a rearranging function for automatically rearranging the data to be displayed according to predetermined conditions, or have an automatic analyzing function for finding a new display item by extracting a characteristic of the data to be analyzed, and a display item-adding function for adding the found new display item to the graph.

With such a construction, when the graph display function includes the display limiting function, since the range of the data to be displayed is limited by the display limiting function, only the data within the range which seems to be the cause of a problem can be displayed. Moreover by limiting the range gradually during the search for the cause of problems, the ultimate cause can be easily found. Furthermore, when the graph display function includes the rearranging function, since the data to be displayed in a graph is rearranged in various orders by the rearranging function, the cause of problems may become apparent from the display order of the data. Furthermore, when the graph display function includes the automatic analyzing function and the display item-adding function, the display item found in the automatic analyzing function is added to the graph by the display item-adding function. Hence the cause of problems may become apparent. Therefore, the data analysis efficiency can be improved by the graph display function having one of the display limiting function, the rearranging function, or the automatic analyzing function and the display item-adding function.

Furthermore, the graph display function may comprise a storage function for storing the result of the operation performed on the graph display function as a summing up condition used by the cross tabulation display function, and the cross tabulation display function is capable of displaying cross tabulation in which the data to be analyzed is cross-summed up according to the stored summing up condition.

With such a construction, a result of the operation performed on the graph display function is stored by the storage function as a summing up condition, and by utilizing this summing up condition, the cross tabulation in which the data to be analyzed is cross-summed up can be displayed. Therefore, the operation performed in the search of causes of problems can also be utilized in the next search. Hence the analysis processing efficiency can be markedly improved.

Furthermore, the data to be analyzed may be an aggregate of records composed of a number of data items.

With such a construction, the data to be analyzed can be handled as an aggregate of records composed of the same data item. Hence the relevant records can be handled in a block by a simple operation.

In addition to this, the graph display function may include a random extraction function for extracting a predetermined number of records at random from the data to be analyzed, so that a graph is displayed based on the extracted data.

With such a construction, only a predetermined number of records are extracted at random by the random extraction function, and a graph is displayed based on the extracted records. Hence the number of records used for the display of the graph is reduced. Therefore, when a graph is displayed, the time for reading out the records from the database or the like is reduced, so that it becomes possible to display at a high speed in the graph display function.

Furthermore, the graph display function may have a structure such that a graph is displayed designating the data item as an axis.

With such a construction, since the value of the data item is displayed on the axis, the size of the value can be grasped intuitively. Thus the trend of the data can be easily grasped.

Furthermore, the structure may be such that the graph display function comprises the same number of axes as the data items constituting the records, and plots a point corresponding to a value of each data item with regard to each of the records, to thereby display a graph in which points plotted on adjacent axes are connected by a segment.

With such a construction, since the correlation between the data items of each record and the correlation between the records are displayed visually, it becomes possible to search the cause of problems very easily.

Other objects and aspects of the present invention will become apparent from the following description of the embodiments given in conjunction with the appended drawings.

DETAILED DESCRIPTION OF THE PREFERRED EMBODIMENTS

The present invention will now be described in detail with reference to the accompanying drawings.

First, an outline of the present invention will be discussed. Based on a cross tabulation preparing function such as the OLAP and the like which operates in such a manner that an information model is defined as meta data independent from the data, the orientation of the meaning of the summed up data and the search for the cause is performed by a graph display function such as a visualizer based on parallel coordinates (described in detail below). Namely, the cross tabulation preparing function and the graph display function operate in close cooperation, and when a user, being an analyst, operates one of the cross tabulation preparing function and the graph display function, this operation is reflected on the other. Hence the data analysis work can be performed intuitively. Incidentally, in the embodiment described below, the data mining method is utilized to effectively utilize large volumes of data stored in the data warehouse.

Figure 1:
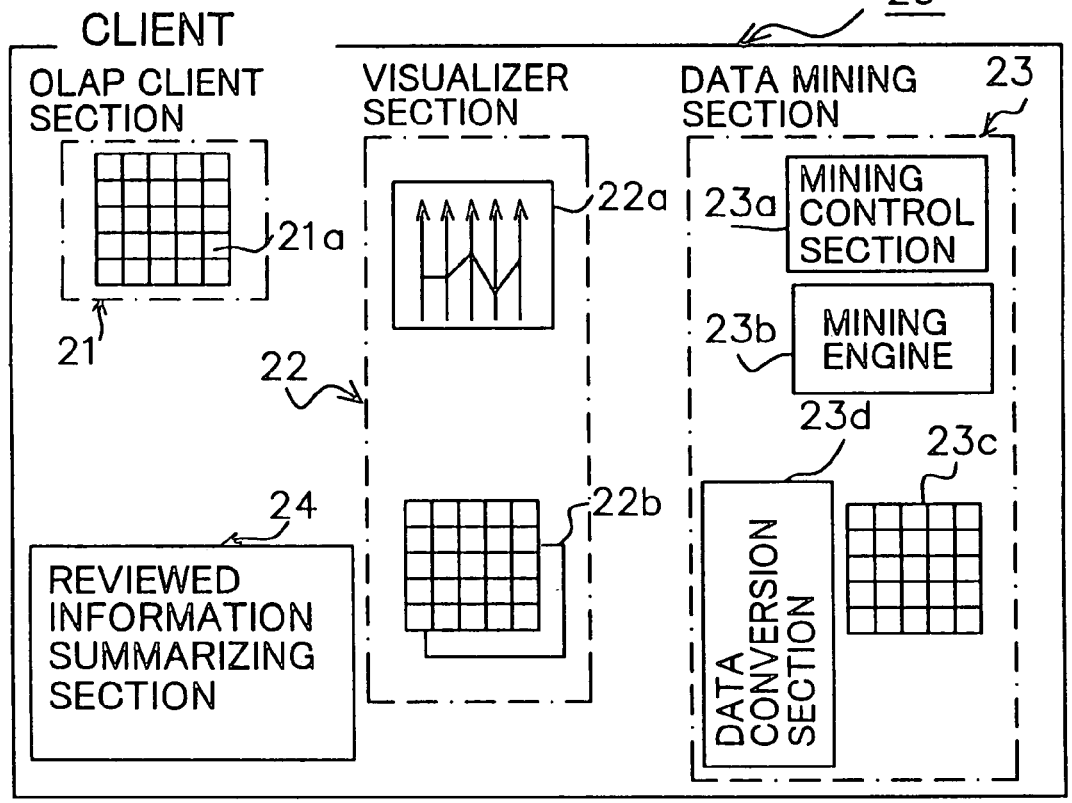
FIG. 1 is a system structure diagram showing one embodiment of the present invention.
Figure 2:
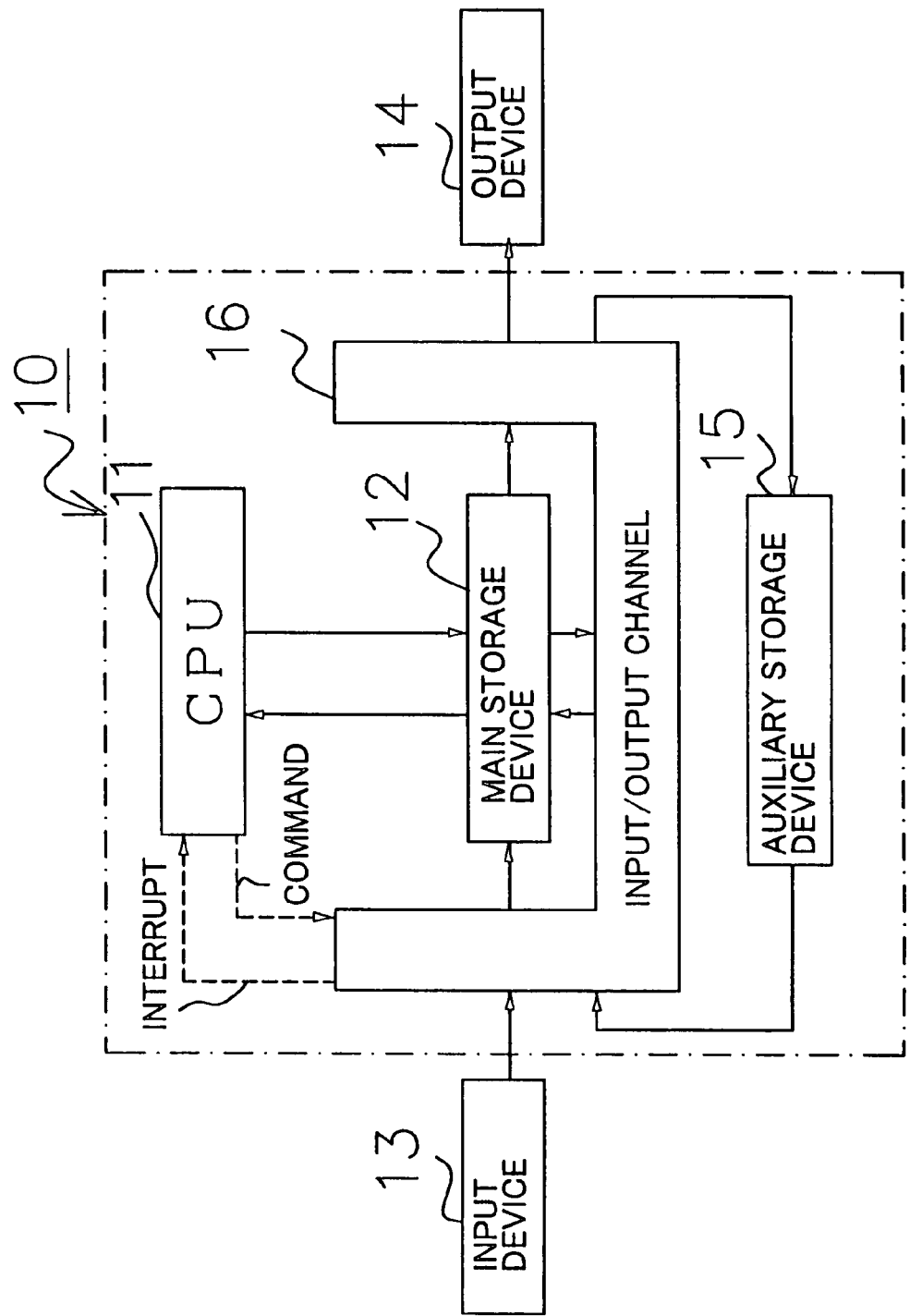
FIG. 2 is a detailed structure diagram showing a computer system of the embodiment shown in FIG. 1.

FIG. 1 and FIG. 2 show a system structure of one embodiment in which the interactive data analysis support apparatus according to the present invention is realized on a general purpose computer system.

Here, as the general purpose computer system, there can be mentioned computers such as a personal computer, a work station, and the like. Namely, as shown in FIG. 2, a computer system 10 comprises, a central processing unit 11 (hereinafter, referred to as a CPU), a main storage device 12, an input device 13, an output device 14, an auxiliary storage device 15, and an input/output channel 16. The CPU 11 controls the interpretation and execution of commands. The main storage device 12 stores programs and processing result data processed by the CPU 11. The input device 13 is a device such as a keyboard or the like which takes in the data from outside of the computer system 10 and sends the data to the main storage device 12. The output device 14 is a device such as a CRT or the like which takes out the processing result data stored in the main storage device 12 to outside of the computer system 10. The auxiliary storage device 15 is a device such as a magnetic disk or the like which stores programs and data for a long period of time. The input/output channel 16 sends and receives the data between the main storage device 12 and the peripheral equipment (the input device 13, the output device 14 and the auxiliary storage device 15).

An interactive data analysis support program stored in a portable storage medium such as a CD-ROM or the like is installed on a magnetic disk serving as the auxiliary storage device 15, from a CD-ROM drive, to execute the interactive data analysis support program.

FIG. 1 shows a system structure of a client/server distributed method in which the data warehouse is designated as the server and the OLAP is designated as the client. That is, the server controls the data on the disk, and processes the processing request from the client. With this structure, it becomes possible to access a data warehouse created by the client on a different architecture.

The client 20 comprises an OLAP client section 21, a visualizer section 22, a data mining section 23 and a reviewed information summarizing section 24.

Figures 3, 4:
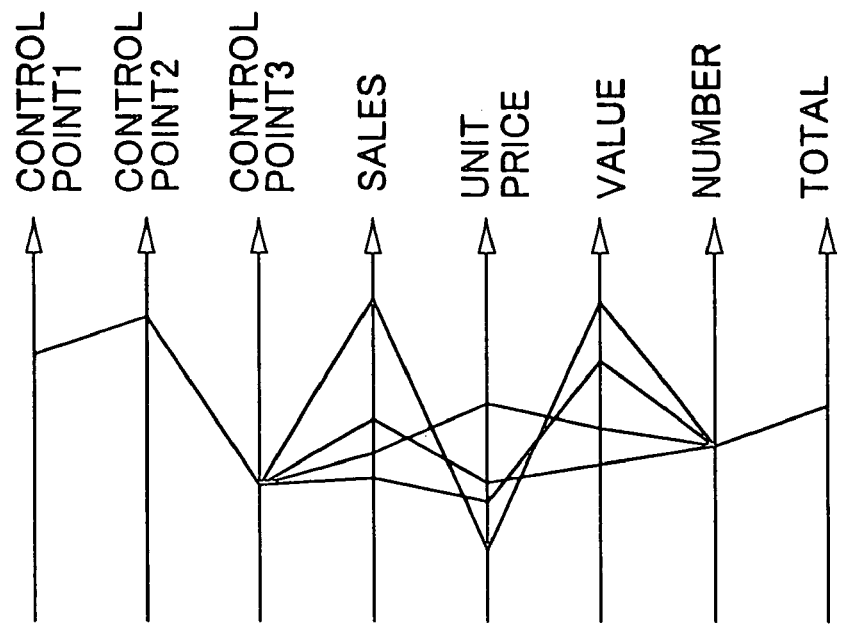
FIG. 3 is a diagram showing one example of a cross tabulation displayed on an OLAP.
FIG. 4 is a diagram showing one example of a graph displayed on a visualizer.

The OLAP client section 21 comprises an OLAP 21a for preparing a cross tabulation as shown in FIG. 3, comprising table side items and table top items as control points set by the user. The OLAP 21a is for inputting numerals into cells corresponding to predetermined table side items and table top items to thereby effect summing up. Incidentally, as the control points, not only table side items and table top items, but also other items can be set.

Here, when the data is organized in the OLAP 21a, methods involving for example "definition of sections", "definition of axes", and "definition of hierarchy of sections" are used. Definition of sections means grouping character data and category data in an optional bundle, or bundling up numerical value data within an optional range. For example, the Metropolis of Tokyo, Kanagawa prefecture and Chiba prefecture are grouped in a section of "Kanto area". The "definition of axes" means to define a new axis in a sense, as a result of defining an optional section with a predetermined data item. For example, an axis of "age" is divided for every 10 years to define a new axis of "generation". The "definition of hierarchy of sections" means making an upper concept by defining a new section based on a section defined by a predetermined section. For example, after defining Shibuya, Shinjuku and Tokyo as a section of "Tokyo", and Yokohama and Kawasaki as a section of "Kanagawa", "Tokyo" and "Kanagawa" are defined as a section of "Kanto area". The OLAP 21a uses these sections freely to summarize by means of summing up for every section, and organizes the data to ascertain the cause of problems.

The visualizer section 22 has the function of plotting the data of the cross tabulation prepared by the OLAP client section 21, as shown in FIG. 4, on a graph comprising parallel coordinates, and displaying the segments for every record by superposing them. Specifically, the visualizer section 22 includes a visualizer 22a and a data buffer 22b for the visualizer. The visualizer 22a lets users perform operations such as filtering or the like (the details will be described later), while displaying a graph comprising parallel coordinates. The data buffer 22b for the visualizer comprises at least one two-dimensional array according to the number of control points defined by the OLAP client section 21, and stores the data used in the visualizer 22a.

The visualizer 22a has a function of displaying at least information described below so that when displaying a graph comprising parallel coordinates, a user can know by analogy a macro trend and characteristic, and the cause of problems:

(1) Table side items and table top items as control points in the cross tabulation;

(2) Other control points;

(3) Detailed values of all random-sampled items;

(4) Rough summed up value of for example the number of cases or sum in a combination of all control points; and (5) Abnormal data (including unique data).

Here, the reason for including the summed up value in the combination of all control points is for the following reasons. For example, when investigating the cause of an increase in a value of a certain cell in the cross tabulation, the following sources can be considered as sources which cause an abnormal value for the summed up value on a cross tabulation. That is, the summed up value increases because the value of a certain cell increases due to mixing of detailed data having an abnormal value, or the number of cases of data to be studied is large. Therefore, the summed up value in the combination of all control points is included in order to display the abnormal detailed data and the statistic such as the number of cases of data to be studied simultaneously, so that the user can easily recognize such a state.

In this case, the statistic may be a general statistic. Namely, there is no need to access all records of large volumes of data stored in the data warehouse 32 (to be described later), the statistic of random-sampled data contained in the data buffer 22b for the visualizer being sufficient. This is because, if the user can grasp the relative trend or characteristic of the data to be displayed, he/she can adequately perform the data analysis. Furthermore, which condition of data is handled as the abnormal value is decided based on the random-sampled data, and data is then extracted from the data warehouse 32 under the decided condition.

On the visualizer 22a, filtering can be performed for each axis by a drag operation with a pointing device such as a mouse and the like, as the display-limiting device or function. That is, when the upper end or the lower end of an axis is clicked and dragged to the range desired to be displayed, only the segment representing the data included in the specified range is emphatically displayed by color, luminance or the like. Therefore, the user can search the cause of problems intuitively by studying the emphatically displayed segment.

Furthermore, the visualizer 22a needs to have the following functions:

(1) Condition selection view of the cross tabulation itself. That is, at least one cell is specified from a number of cells in the cross tabulation (cell-specifying device or function), and the detailed data can be displayed visually under the selected condition.

(2) Display and filtering operations can be performed at high speed.

(3) The trend of the whole information, and the abnormal value can be easily grasped.

(4) When the trend is grasped, meaningless information is automatically not displayed. Thus noiseless information is presented. Furthermore, information having relativity hierarchically can be hierarchically detailed by the drilling operation.

The mechanism for not displaying data having low importance will now be described. Regarding items defined hierarchically amongst the control points, only the first hierarchy is initially displayed, and the low rank hierarchies are displayed in sequence according to the instruction of the user. When the range is limited by the high rank hierarchy, then in the low rank hierarchies, only the data within the range of the selected high rank hierarchy is displayed (drilling). In addition, the correlation between the data items is taken, and data having a very strong correlation is not displayed. Alternately, the main component is displayed as a new axis, and the original items are evolved into low rank hierarchies. In addition, with regard to data of a nominal scale, the value is decided by the appearance frequency and the entropy (volume of information) of each data.

(5) New classification can be done automatically from the similarity of segments (automatic analyzing device or function). A new classification axis is then added as the result of the classification (display item-adding device or function), and selected display of each classification can be made by a simple filtering operation.

Namely, by using the data mining method, after the characteristic of the data to be analyzed is automatically extracted, a classification axis which is a new control point is found, and added on the visualizer 22a.

(6) Items of each axis which has a strong relativity to a specific group can be rearranged automatically in the vicinity of each other and displayed according to predetermined conditions (rearranging device or function).

(7) The information organized on the visualizer 22a can be stored immediately as meta data (storing device or function). The information can then be utilized as a section by the OLAP 21a.

(8) The result filtered on the visualizer 22a is notified to the OLAP 21a, and not only can the verification on the visualizer 22a be done, but also the high accuracy verification work with which the OLAP 21a is engaged can be done.

The data mining section 23 has a function for automatically extracting only the useful data from the data buffer 22b for the visualizer. Specifically, the data mining section 23 comprises a mining control section 23a, a mining engine 23b, a data buffer 23c for mining, and a data conversion section 23d. The mining control section 23a performs various controls of the data mining processing. The mining engine 23b actually performs the data mining processing. The data buffer 23c for mining, temporarily stores the data used at the time of data mining processing. The data conversion section 23d performs the data conversion between the data buffer 23c for mining and the data buffer 22b for the visualizer.

The reviewed information summarizing section 24 is primarily to improve the processing speed by decreasing the number of cases to be retrieved, by random-sampling the data from the data warehouse 32 on the server 30 side, when a graph is displayed on the visualizer section 22. Namely, it works as a random extraction device or function. Since in this way, the random-sampled result statistically holds a macro trend and characteristic, the user can consider that the data displayed on the visualizer section 22 represents the whole information which the user envisages.

Furthermore, the reviewed information summarizing section 24 has a function to sum up the random-sampled data for every control point. In addition, the reviewed information summarizing section 24 has a function to compute the condition of the boundary of the externally inserted value by calculating the value of a hinge and a fence for every axis, from the random-sampled data. It can also notify the condition of the boundary of the externally inserted value to the reviewed information collecting section 34 described below, to thereby extract only the abnormal detailed data.

On the other hand, the server 30 comprises an OLAP server section 31, a data warehouse 32, a data mining section 33 and a reviewed information collecting section 34.

The OLAP server section 31 has a function to correspond to the processing request from the OLAP client section 21 on the client 20 side. Specifically, the OLAP server section 31 comprises server software 31a, a meta data file 31b, a summing up result file 31c and a summing up engine 31d. The server software 31a controls various processing. The meta data file 31b stores meta data which defines the structure, content, key and index of the data. The summing up result file 31c becomes the database for operation when the data is extracted from the data warehouse 32. The summing up engine 31d performs summing up processing while adding the meta data stored in the meta data file 31b.

The data warehouse 32 is designed to support a decision making support system function, and is an aggregate of a database directing an integrated subject. A number of records comprising a number of data items are collected in the database, to form one group of data to be analyzed.

The data mining section 33 has a function to extract automatically only the useful data from the data warehouse 32. Specifically, the data mining section 33 comprises a mining control section 33a, a mining engine 33b, a data buffer 33c for mining, and a data conversion section 33d. The mining control section 33a performs control of the data mining processing. The mining engine 33b actually performs the data mining processing. The data buffer 33c for mining, temporarily stores the data used at the time of data mining processing. The data conversion section 33d performs the data conversion between the data buffer 33c for mining and the data warehouse 32.

The reviewed information collecting section 34 has a function to random-sample the data from the data warehouse 32 and deliver the random-sampled data to the reviewed information summarizing section 24 on the client 20 side.

The cross tabulation display device or function is realized by the OLAP client section 21 and the OLAP server section 31, and the graph display device or function is realized by the visualizer section 22, the data mining section 23 and the reviewed information summarizing section 24 on the client 20 side, and the data mining section 33 and the reviewed information collecting section 34 on the server 30 side.

The processing of the interactive data analysis support apparatus will now be described with reference to the processing flow charts and the flow charts of FIG. 5 to FIG. 14.

Figure 5:
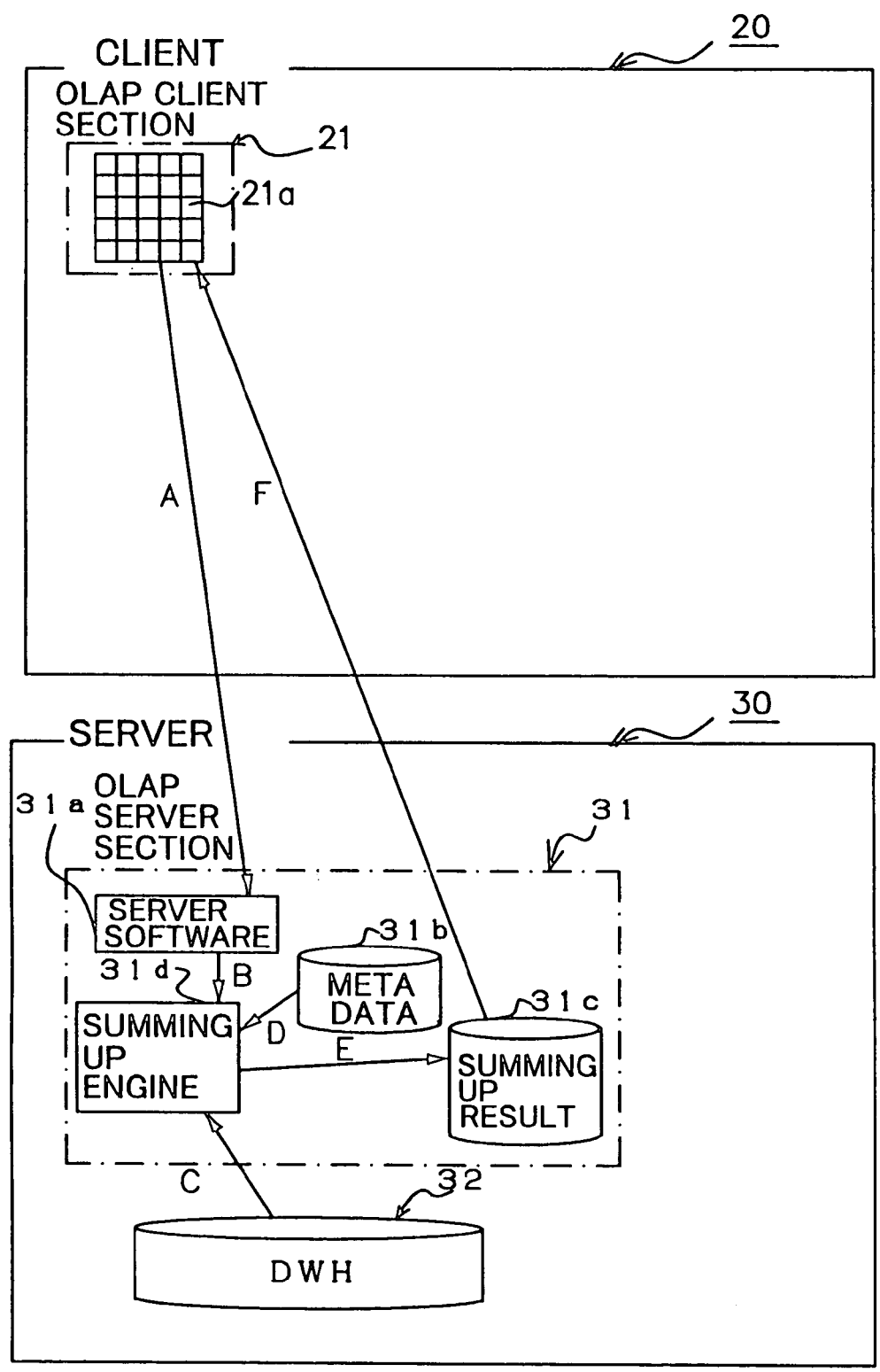
FIG. 5 is a processing flow chart showing the processing for displaying the cross tabulation.
Figure 6:
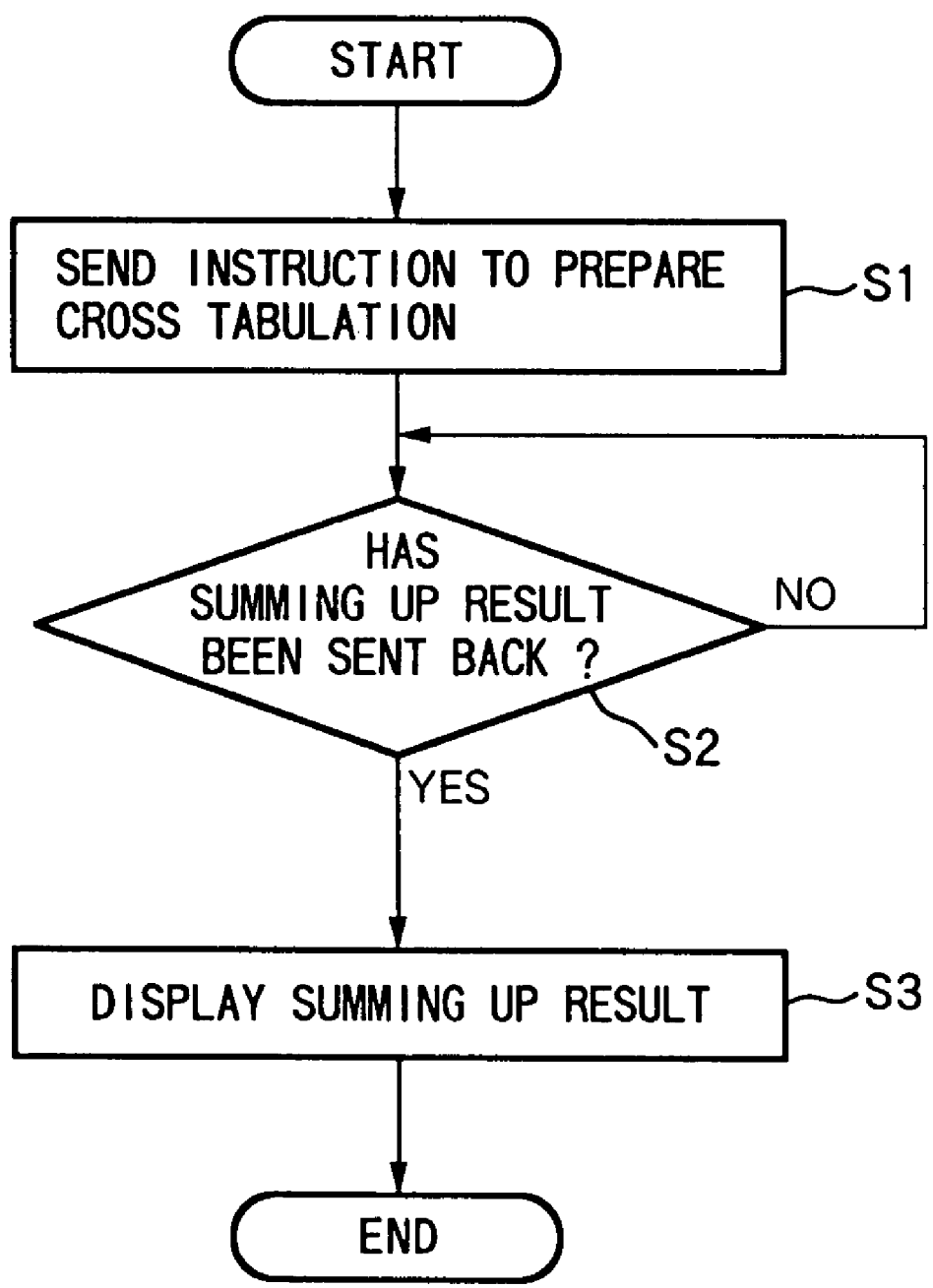
FIG. 6 is a flow chart showing the processing for displaying the cross tabulation on the client side.
Figure 7:
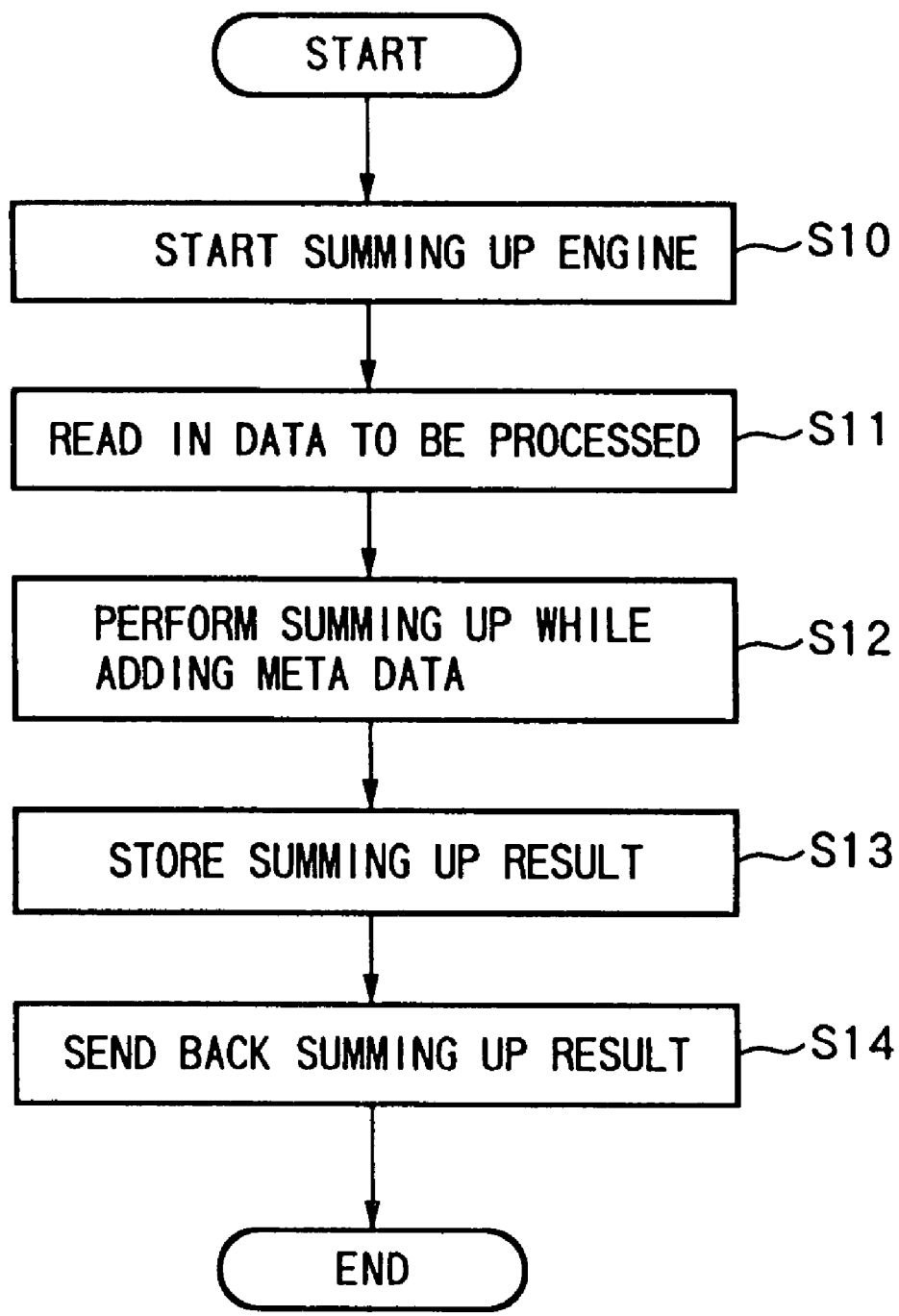
FIG. 7 is a flow chart showing the processing for displaying the cross tabulation on the server side.

FIG. 5 to FIG. 7 show the processing flow up until the summing up result of the cross summing up is displayed on the OLAP 21a, and flow charts illustrating the contents of the processing. Namely, there is shown the contents of the processing when a user who is operating the OLAP 21a gives an instruction to prepare the cross tabulation, by specifying the section.

FIG. 6 is a flow chart showing details of the contents of the processing on the client side 20, up until the summing up result is displayed on the OLAP 21a. This routine is executed when the user gives an instruction to prepare the cross tabulation.

In step 1 (in the figures, abbreviated to "S1", and so on), the OLAP client section 21 sends an instruction to prepare a cross tabulation to the server software 31a on the server 30 side (Processing A).

In step 2, it is judged if a summing up result has been sent back from the OLAP server section 31 on the server 30 side, control waiting until the summing up result has been sent back.

In step 3, the returned summing up result is displayed on the OLAP 21a.

FIG. 7 is a flow chart showing details of the contents of the processing on the server 30 side, up until the summing up result is displayed on the OLAP 21a. This routine is executed when the instruction to prepare the cross tabulation is received from the client 20 side.

In step 10, the server software 31a which has received the instruction to prepare the cross tabulation, starts the summing up engine 31d (Processing B).

In step 11, the summing up engine 31d reads in the data to be processed from the data warehouse 32 (Processing C).

In step 12, the summing up engine 31d reads in the meta data from the meta data file 31b, and performs the summing up processing while adding the meta data (Processing D).

In step 13, the summing up engine 31d stores the summing up result added by the meta data, in the summing up result file 31c used for operation (Processing E).

In step 14, the summing up result stored in the summing up result file 31c is sent back to the OLAP client section 21 on the client 20 side (Processing F).

Figure 8:
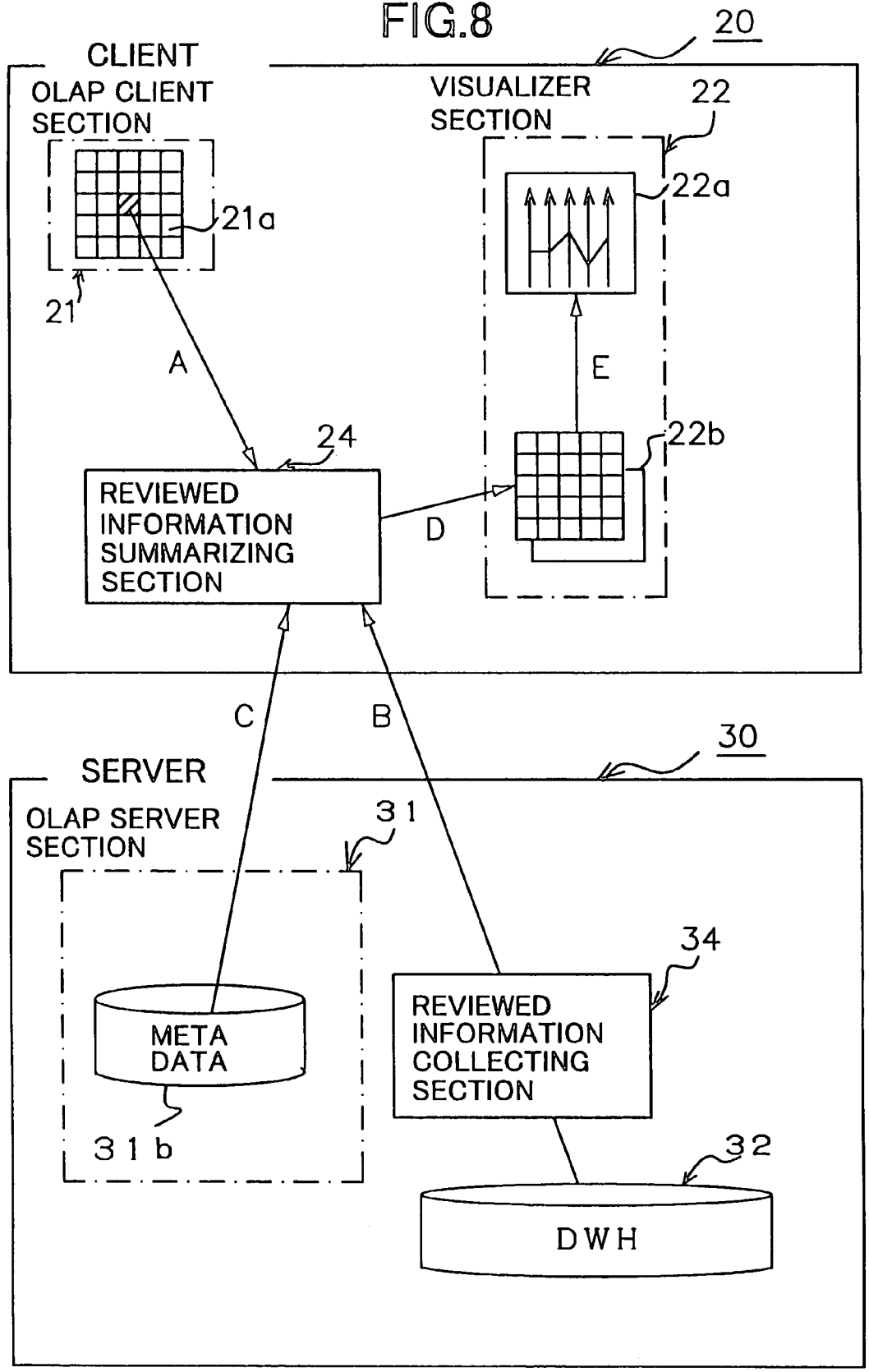
FIG. 8 is a processing flow chart showing the processing for displaying a graph.
Figure 9:
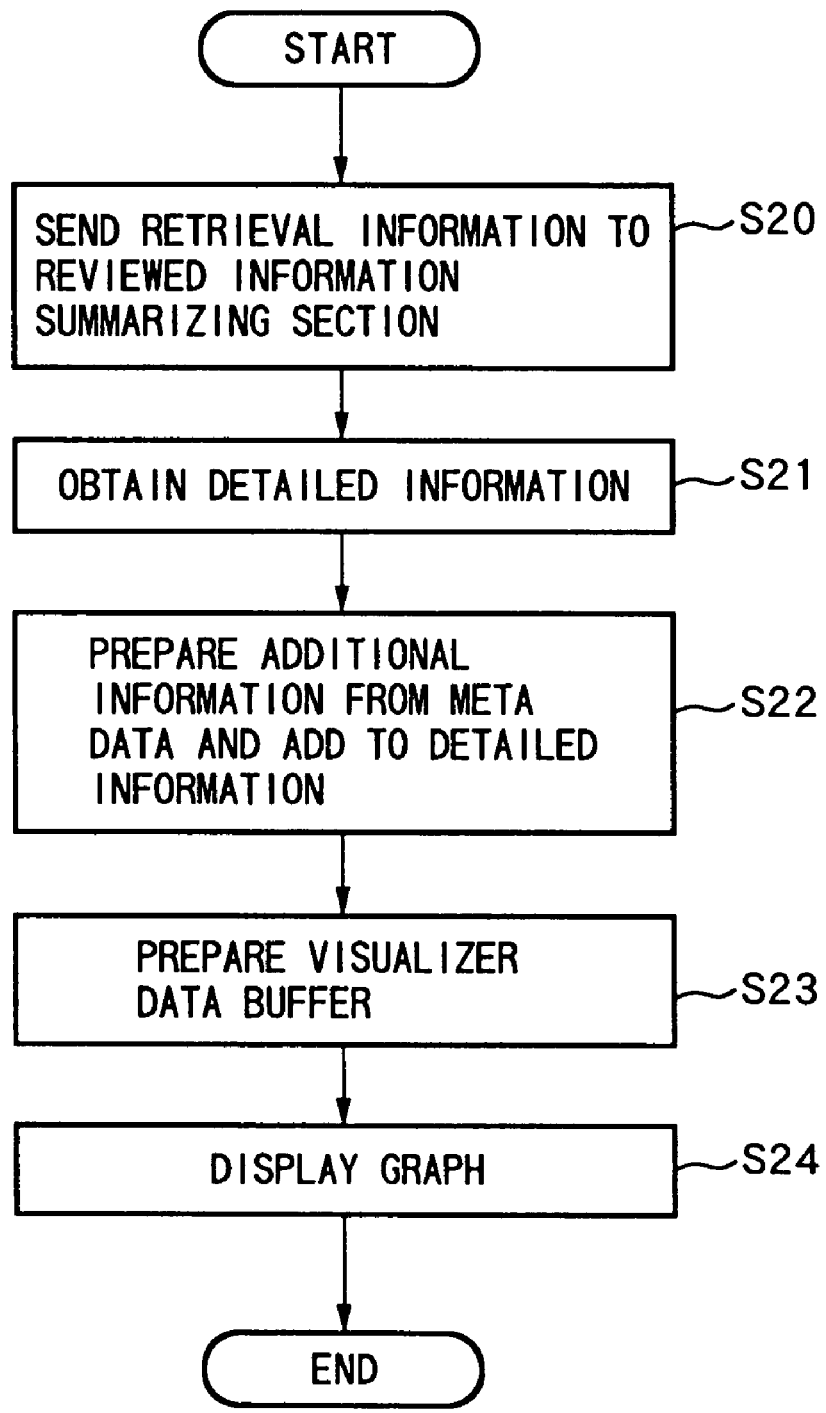
FIG. 9 is a flow chart showing the processing for displaying a graph.

FIG. 8 and FIG. 9 show the processing flow up until the data of the cross tabulation within the range specified by the user is displayed in a graph, under the condition where the summing up result is displayed on the cross tabulation of the OLAP 21a, and a flow chart for explaining the contents of the processing. That is, this processing is executed when the user wants to know the meaning of the result of a cell in a part of the cross tabulation, and specifies the portion with a pointing device such as a mouse or the like to specify the graph display.

In step 20, the database name, the control point and the retrieval condition which have been used to prepare the cross tabulation are sent as retrieval information from the OLAP client section 21 to the reviewed information summarizing section 24 (Processing A).

In step 21, the reviewed information summarizing section 24 obtains the detailed information, summarized information and abnormal detailed information by random-sampling from the data warehouse 32, via the reviewed information collecting section 34 on the server 30 side, based on the sent retrieval information (Processing B). At this time, the setting may be such that the user can set the number of random sampling.

In step 22, the reviewed information summarizing section 24 obtains the meta data stored in the meta data file 31b to thereby prepare the additional information, and adds the additional information to the obtained detailed information, summarized information and abnormal detailed information (Processing C).

In step 23, the reviewed information summarizing section 24 prepares the data buffer 22b for the visualizer based on the detailed information, summarized information and abnormal detailed information to which the additional information has been added (Processing D).

In step 24, the visualizer 22a is started, and the data evolved in the data buffer 22b for the visualizer is displayed in the graph comprising parallel coordinates as a segment for each record (Processing E).

FIG. 10 to FIG. 14 show processing flows executed when the user instructs the processing to update the display contents on the visualizer 22a, for example, when the user instructs the automatic classification of the data or rearrangement of the axis items, and show flow charts for explaining the contents of the processing. The processing to update the display content is performed on the client 20 side when the volume of data to be updated is less than a predetermined volume, and on the server 30 side when the volume of data to be updated is equal to or more than a predetermined volume.

Figure 10:
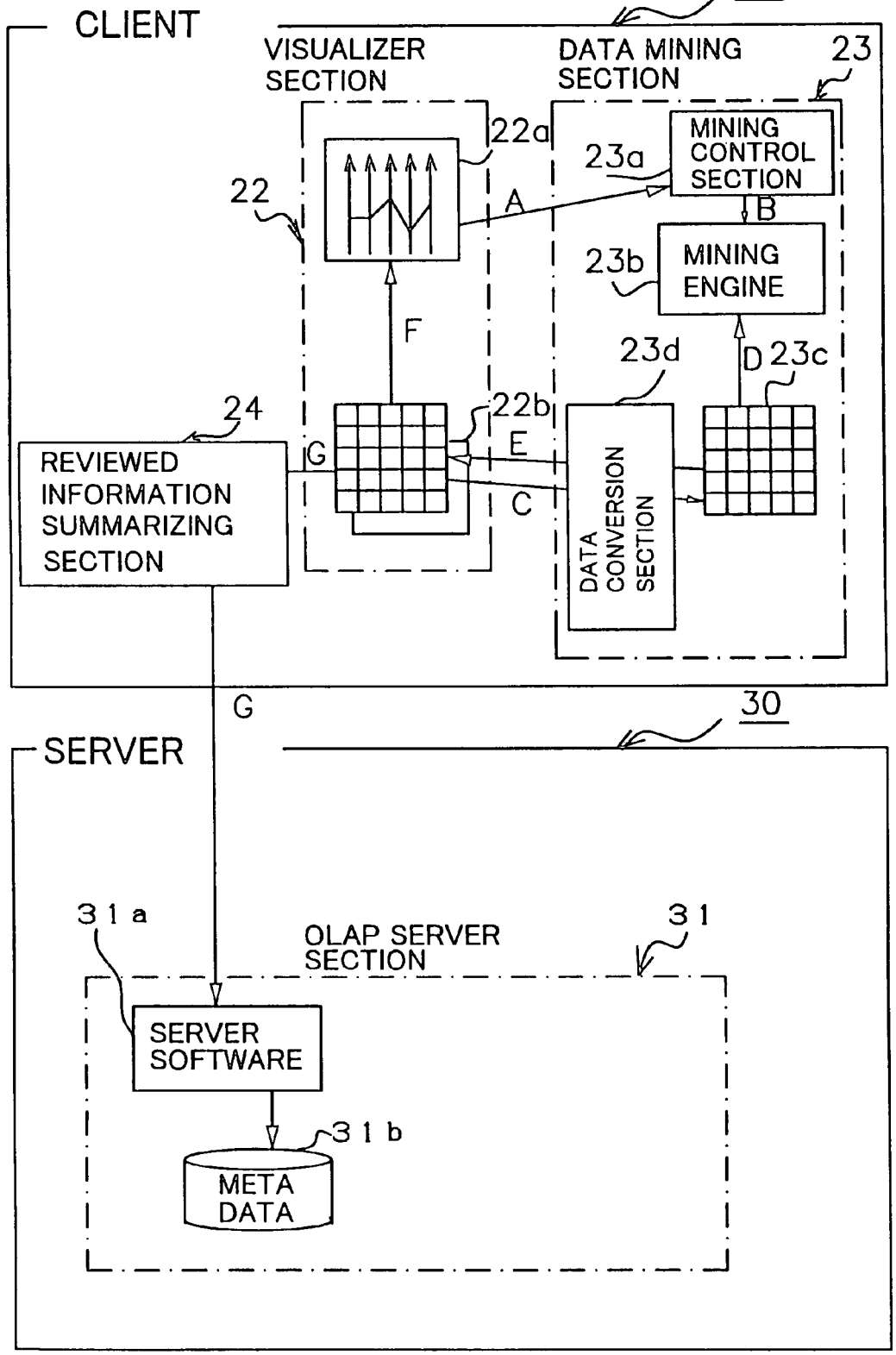
FIG. 10 is a processing flow chart for when the processing for updating the display of a graph is performed on the client side.
Figure 11:
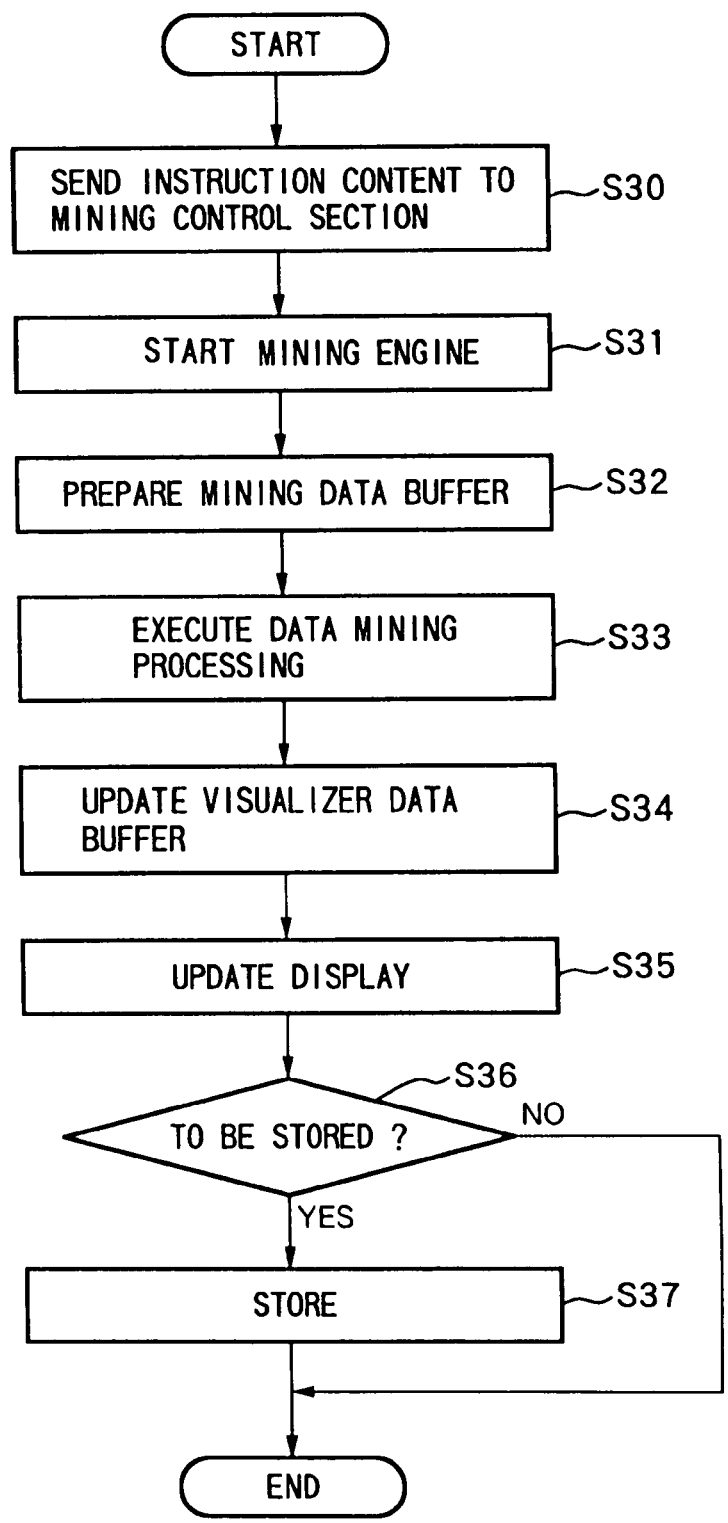
FIG. 11 is a flow chart for when the processing for updating the display of a graph is performed on the client side.

FIG. 10 and FIG. 11 show the contents of processing when the update processing of the display contents on the visualizer 22a is performed on the client 20 side.

In step 30, the contents of the instruction to update the display content is sent to the mining control section 23a of the data mining section 23 (Processing A).

In step 31, the mining control section 23a initializes the mining engine 23b on the client 20 side (Processing B).

In step 32, the mining engine 23b converts the data in the visualizer data buffer 22b via the data conversion section 23d, to prepare the mining data buffer 23c used for mining engine input (Processing C).

In step 33, the mining engine 23b inputs the data from the mining data buffer 23c to perform the data mining processing (Processing D).

In step 34, the mining control section 23a converts the result of the data mining processing performed by the mining engine 23b into the data for the visualizer via the data conversion section 23d. The mining control section 23a then updates the content of the visualizer data buffer 22b based on the converted processing result (Processing E).

In step 35, the visualizer 22a updates the display content based on the data in the visualizer data buffer 22b (Processing F). As a result, the result of the automatic classification of the data or the rearrangement of the axis items is displayed on the visualizer 22a.

In step 36, the processing to select whether or not the result on the visualizer 22a is stored as the meta data for a section of new information, is performed by the user. If to be stored, control proceeds to step 37, and if not, the routine is terminated.

In step 37, the reviewed information summarizing section 24 converts the data in the visualizer data buffer 22b to the meta data format, and stores the meta data in the meta data file 31b via the server software 31a on the server 30 side (Processing G).

Figure 12:
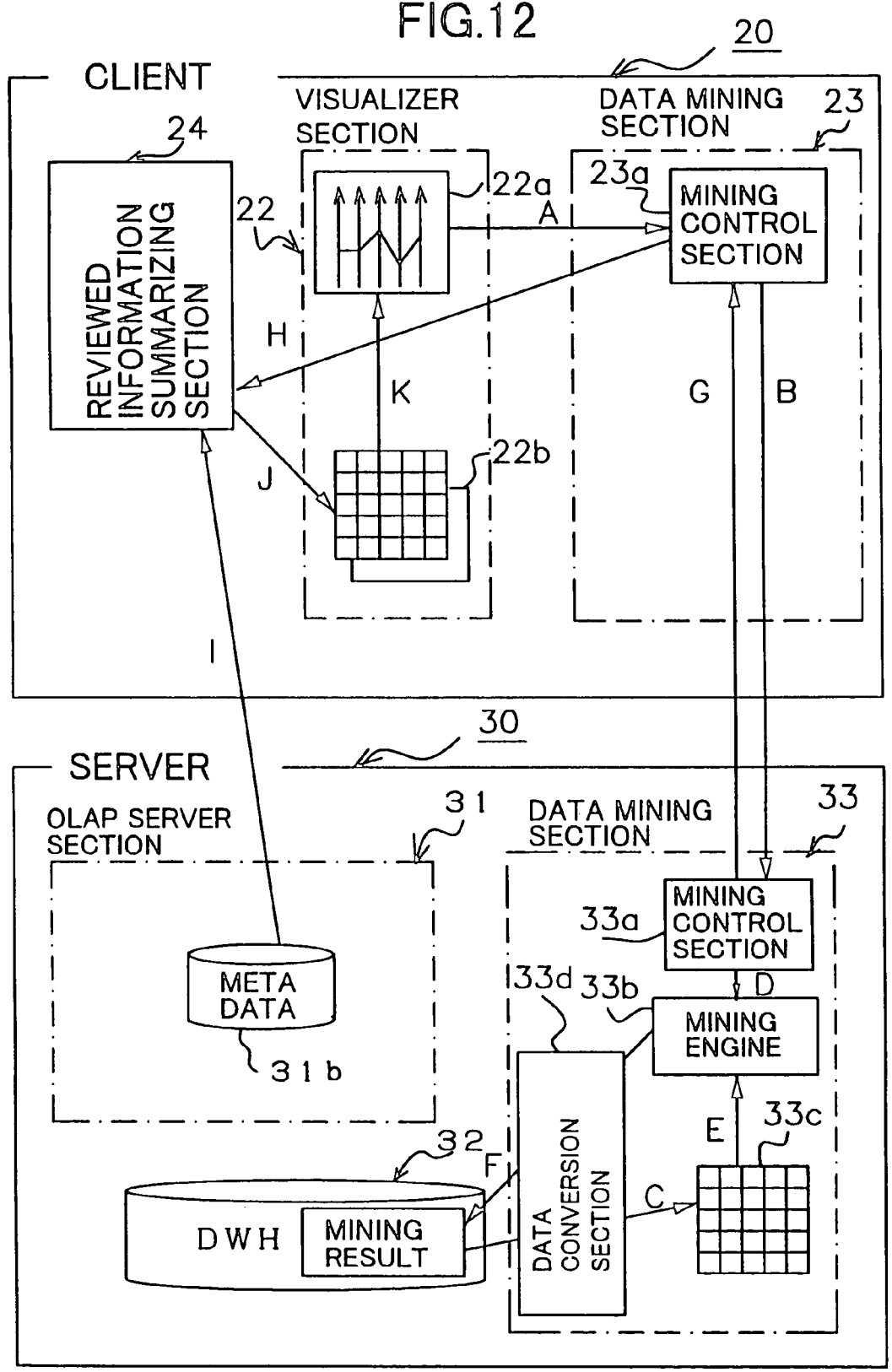
FIG. 12 is a processing flow chart for when the processing for updating the display of a graph is performed on the server side.
Figure 13:
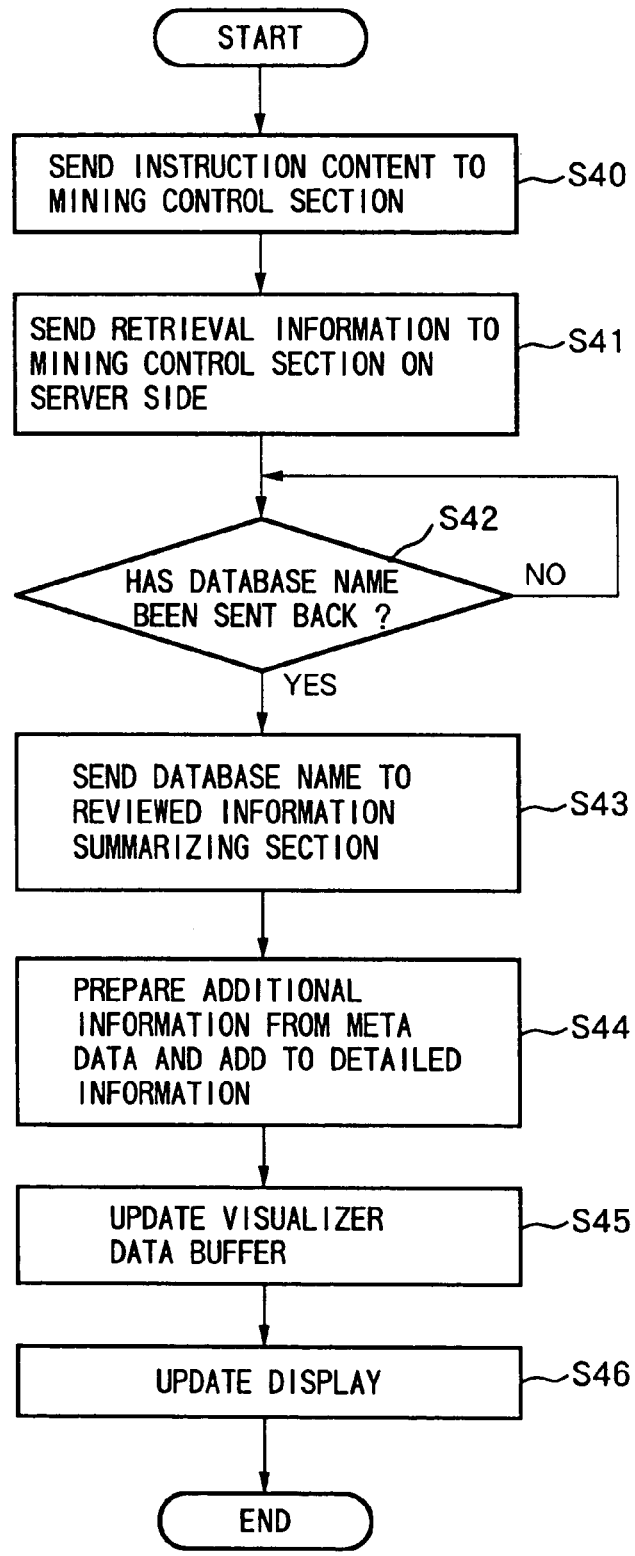
FIG. 13 is a flow chart showing the processing for updating the display of a graph on the client side.
Figure 14:
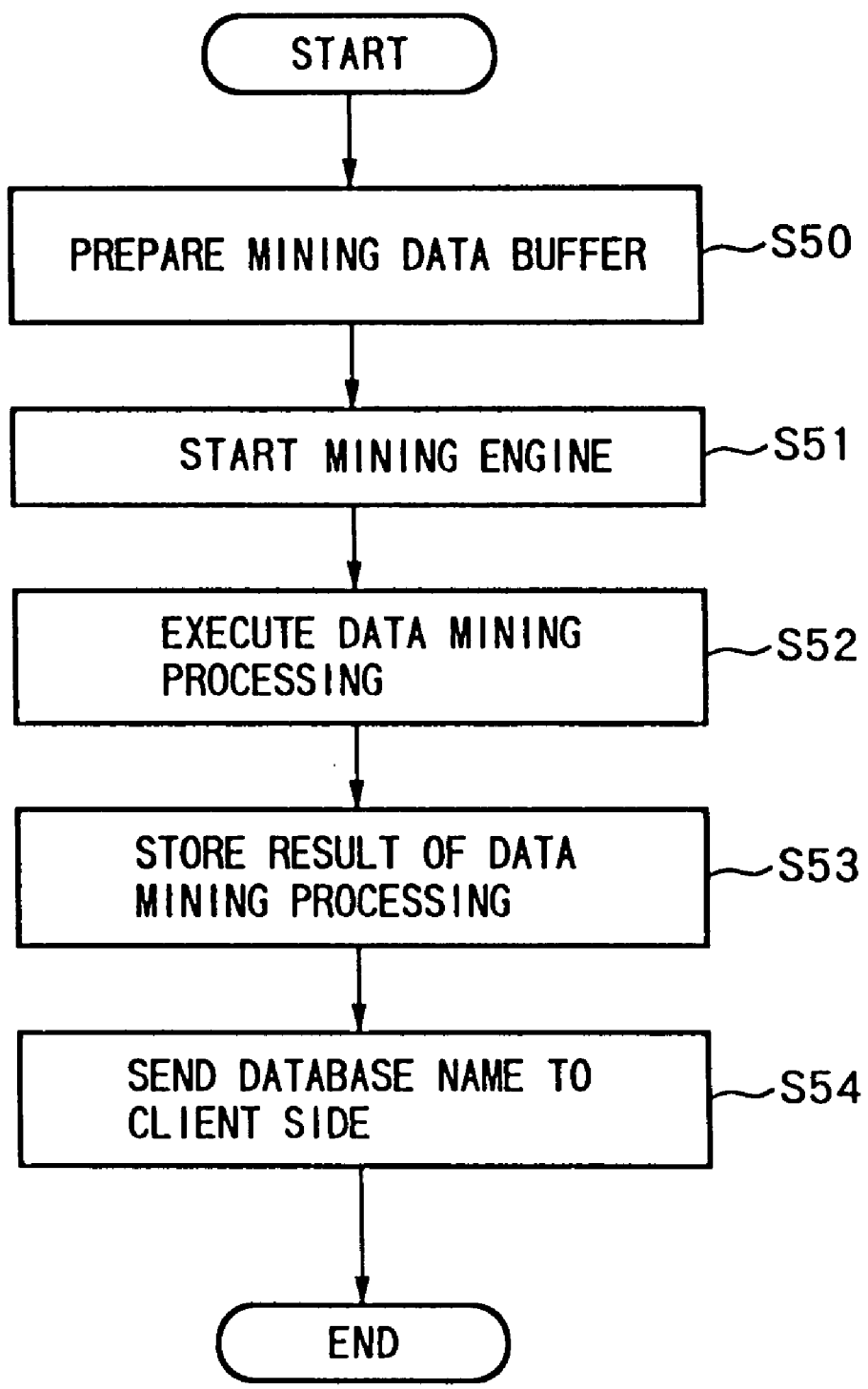
FIG. 14 is a flow chart showing the processing for updating the display of a graph on the server side.

FIG. 12 to FIG. 14 show the contents of the processing when the update processing of the display contents on the visualizer 22a is performed on the server 30 side. Specifically, FIG. 12 is the overall processing flow chart, FIG. 13 is a flow chart for explaining the contents of the processing on the client 20 side, and FIG. 14 is a flow chart showing the contents of the processing on the server 30 side.

First, the processing on the client 20 side will be described.

In step 40, the instruction content for updating the display content is sent to the mining control section 23a of the data mining section 23 (Processing A).

In step 41, the mining control section 23a sends the database name, the control point and the retrieval condition which have been used to prepare the cross tabulation, as retrieval information to the mining control section 33a on the server 30 side (Processing B).

In step 42, it is decided whether or not the name of the database in which the result of the data mining processing is stored and the control point have been sent back from the mining control section 33a on the server 30 side, control waiting until these have been sent back.

In step 43, the mining control section 23a sends the returned database name and the control point to the reviewed information summarizing section 24 (Processing H).

In step 44, the reviewed information summarizing section 24 obtains the meta data stored in the meta data file 31b on the server 30 side to prepare the additional information. The reviewed information summarizing section 24 then adds the additional information to the detailed information, summarized information and abnormal detailed information obtained from the data warehouse 32, based on the returned database name and the control point (Processing I).

In step 45, the reviewed information summarizing section 24 updates the contents of the visualizer data buffer 22b, based on the detailed information, summarized information and abnormal detailed information to which the additional information has been added (Processing J).

In step 46, the visualizer 22a updates the display content based on the data in the visualizer data buffer 22b (Processing K). As a result, the result of the automatic classification of the data or the rearrangement of the axis items is displayed on the visualizer 22a.

The processing on the server 30 side will now be described.

In step 50, the mining control section 33a reads in the data to be processed from the data warehouse 32 via the data conversion section 33d, based on the database name, the control point and the retrieval condition sent from the client 20 side as the retrieval information, and prepares the mining data buffer 33c (Processing C).

In step 51, the mining control section 33a starts the mining engine 33b (Processing D).

In step 52, the mining engine 33b inputs the data of the mining data buffer 33c, and performs data mining processing (Processing E).

In step 53, the mining control section 33a converts the result of the data mining processing performed by the mining engine 33b into the database format via the data conversion section 33d, and stores the result of the converted data mining processing in the data warehouse 32 (Processing F).

In step 54, the mining control section 33a sends back the name of the database in which the result of the data mining processing is stored and the control point to the mining control section 23a on the client 20 side (Processing G).

With such a structure, in the OLAP for end-users, after the range desired to search for the cause of problems is specified, the data to be analyzed within such a range can be displayed on a graph comprising parallel coordinates. Then, on the displayed graph, operations such as filtering and automatic classification are performed to thereby gradually discern the cause of problems. Hence, analysis of the cross tabulation with high accuracy using new concepts becomes possible without high-level experience or skills.

Furthermore, at the time of graph display, all records of data to be analyzed are not handled, but a predetermined number of records being sampled at random to be used. Therefore, for example, the processing time is reduced due to the decrease in the number of cases to be accessed to the database, and graph display can be performed at high speed. Thus, even though the data volume to be handled is reduced by random-sampling of the records, since the graph displays the trend and characteristic of the macro data, the processing to analyze the data is not affected. Hence interruption of contemplation due to the high-speed display is prevented, so that extremely effective analysis work becomes possible.

In short, even if an end-user has no high-level knowledge regarding data mining, a person in charge who has a deep insight in the field can utilize the data mining method for the search of the causes of problems without being aware of so doing.

We claim:

1. An interactive data analysis support apparatus for supporting the analysis of data, said apparatus comprising:
   random extraction means for automatically extracting a random sampling of data from contents of a data warehouse;
   cross tabulation display means for displaying a cross tabulation according to summing up conditions for defining the range of the data to be displayed in which the random sampling of data extracted from the contents of the data warehouse by the random extraction means is cross summed up;
   cell specifying means for specifying at least one cell among a number of cells constituting said cross tabulation; and
   graph display means for displaying the random sampling of data extracted from the contents of the data warehouse as a graph within the range of the cell specified by said cell specifying means,
   wherein said graph display means comprises:
      display limiting means for limiting the range of the data to be displayed; and
      storage means for storing the range of the data to be displayed which is limited by said display limiting means as a summing up condition used by said cross tabulation display means, and said cross tabulation display means is capable of displaying cross tabulation in which the random sampling of data extracted from the database is cross-summed up according to the summing up condition stored by said storage means.

2. The interactive data analysis support apparatus according to claim 1, wherein said graph display means comprises rearranging means for automatically rearranging in a graph the data to be displayed according to predetermined conditions.

3. The interactive data analysis support apparatus according to claim 2, wherein said graph display means stores, in said storage means, a summing up condition for limiting the range of the data to be displayed based upon the data which is rearranged by said rearranging means.

4. The interactive data analysis support apparatus according to claim 1, wherein said graph display means comprises:
   automatic analyzing means for finding a new display item by extracting a characteristic of the random sampling of data extracted from the contents of the data warehouse, and display item-adding means for adding the new display item found by said automatic analyzing means to the graph.

5. The interactive data analysis support apparatus according to claim 4, wherein
   said graph display means stores, in said storage means, a summing up condition for limiting the range of the data to be displayed based upon the new display item, added by said display item-adding means.

6. The interactive data analysis support apparatus according to claim 1, wherein the random sampling of data extracted from the contents of said data warehouse is an aggregate of records composed of a number of data items.

7. The interactive data analysis support apparatus according to claim 6, wherein said graph display means has a structure such that a graph is displayed designating said data item as an axis.

8. The interactive data analysis support apparatus according to claim 7, wherein said graph display means comprises the same number of axes as the data items constituting said records, and plots a point corresponding to a value of each data item with regard to each of said records, to thereby display a graph in which points plotted on adjacent axes are connected by a segment.

9. A computer-readable medium on which is recorded an interactive data analysis support program for supporting the analysis of data wherein there is recorded at least a program for executing:
   a random extraction operation extracting a random sampling of data automatically from contents of a data warehouse;

a cross tabulation display operation displaying a cross tabulation according to summing up conditions for defining the range of the data to be displayed in which the random sampling of data extracted from the contents of the data warehouse by the random extraction operation is cross-summed up;

a cell specifying operation specifying at least one cell among a number of cells constituting said cross tabulation; and a graph display operation displaying the random sampling of data extracted from the contents of the data warehouse as a graph within the range of the cell specified by said cell specifying operation, wherein said graph display operation comprises:
   a display limiting operation for limiting the range of the data to be displayed; and
   a storage operation for storing the range of the data to be displayed which is limited by said display limiting operation as a summing up condition used by said cross tabulation display operation, and said cross tabulation display operation is capable of displaying cross tabulation in which the random sampling of data extracted from the contents of the data warehouse is cross-summed up according to the summing up condition stored by said storage operation.

10. The medium on which is recorded an interactive data analysis support program according to claim 9, wherein said graph display operation comprises a rearranging operation for automatically rearranging in a graph the data to be displayed according to predetermined conditions.

11. The medium on which is recorded an interactive data analysis support program according to claim 10, wherein said graph display operation stores, in said storage operation, a summing up condition for limiting the range of the data to be displayed, based upon the data which is rearranged by said rearranging operation.

12. The medium on which is recorded an interactive data analysis support program according to claim 9, wherein said graph display operation comprises:
   an automatic analyzing operation for finding a new display item by extracting a characteristic of the random sampling of data extracted from the contents of the data warehouse, and a display item-adding function for adding the new display item found by said automatic analyzing operation to the graph.

13. The medium on which is recorded an interactive data analysis support program according to claim 12, wherein said graph display operation stores, in said storage operation, a summing up condition for limiting the range of the data to be displayed based upon the new display item, added by said display item-adding operation.

14. The medium on which is recorded an interactive data analysis support program according to claim 9, wherein the random sampling of data extracted from the contents of the data warehouse is an aggregate of records composed of a number of data items.

15. The medium on which is recorded an interactive data analysis support program according to claim 14, wherein said graph display operation has a structure such that a graph is displayed designating said data item as an axis.

16. A The medium on which is recorded an interactive data analysis support program according to claim 15, wherein said graph display operation comprises the same number of axes as the data items constituting said records, and plots a point corresponding to a value of each data item with regard to each of said records, to thereby display a graph in which points plotted on adjacent axes are connected by a segment.

17. An interactive data analysis support apparatus for supporting the analysis of data, said apparatus comprising:
   a random extraction device automatically extracting a random sampling of data from contents of a data warehouse;
   a cross tabulation display device displaying a cross tabulation according to summing up conditions for defining the range of the data to be displayed in which the random sampling of data automatically extracted from the contents of a data warehouse is cross summed up;
   a cell specifying device specifying at least one cell among a number of cells constituting said cross tabulation; and
   a graph display device displaying the random sampling of data extracted from the contents of the data warehouse as a graph within the range of the cell specified by said cell specifying means,
   wherein said graph display device comprises:
      a display limiting device for limiting the range of the data to be displayed; and
      a storage device for storing the range of the data to be displayed which is limited by said display limiting device as a summing up condition used by said cross tabulation display device, and said cross tabulation display device is capable of displaying cross tabulation in which the random sampling of data extracted from the contents of the data warehouse is cross-summed up according to the summing up condition stored by said storage device.

18. The interactive data analysis support apparatus according to claim 17, wherein said graph display device stores, in said storage device, a summing up condition for limiting the range of the data to be displayed based upon an operation in a graph.

19. The interactive data analysis support apparatus according to claim 17, wherein said graph display device comprises a rearranging device for automatically rearranging in a graph the data to be displayed according to predetermined conditions.

20. The interactive data analysis support apparatus according to claim 17, wherein said graph display means comprises:
   an automatic analyzing device finding a new display item by extracting a characteristic of the random sampling of data extracted from the contents of the data warehouse, and a display item-adding device adding the new display item found by said automatic analyzing device to the graph.

* * * * *

UNITED STATES PATENT AND TRADEMARK OFFICE
CERTIFICATE OF CORRECTION

PATENT NO. : 7,082,568 B2
APPLICATION NO. : 09/014422
DATED : July 25, 2006
INVENTOR(S) : Masaki Iwamoto et al.

It is certified that error appears in the above-identified patent and that said Letters Patent is hereby corrected as shown below:

Column 16, Line 1, Delete "A" before "The".

Signed and Sealed this

Twenty-eighth Day of November, 2006

JON W. DUDAS
*Director of the United States Patent and Trademark Office*